(12) United States Patent
Mykytiuk

(10) Patent No.: US 12,275,527 B1
(45) Date of Patent: Apr. 15, 2025

(54) HELICOPTER AERIAL WILDFIRE SUPPRESSION SYSTEM

(71) Applicant: Basil Mykytiuk, Thousand Oaks, CA (US)

(72) Inventor: Basil Mykytiuk, Thousand Oaks, CA (US)

( * ) Notice: Subject to any disclaimer, the term of this patent is extended or adjusted under 35 U.S.C. 154(b) by 0 days.

(21) Appl. No.: 18/969,924

(22) Filed: Dec. 5, 2024

(51) Int. Cl.
  *A62C 3/02* (2006.01)
  *A62C 5/00* (2006.01)
  *A62C 31/05* (2006.01)
  *A62C 99/00* (2010.01)
  *B64D 1/16* (2006.01)

(52) U.S. Cl.
  CPC ............. *B64D 1/16* (2013.01); *A62C 3/0242* (2013.01); *A62C 5/002* (2013.01); *A62C 31/05* (2013.01); *A62C 99/0009* (2013.01)

(58) Field of Classification Search
  CPC ....... A62C 3/0242; A62C 5/002; A62C 31/05; A62C 99/0009; B64D 1/16
  See application file for complete search history.

(56) References Cited

U.S. PATENT DOCUMENTS

| | | | | |
|---|---|---|---|---|
| 3,442,334 A * | 5/1969 | Spero | ................ | B64D 1/16 169/53 |
| 3,580,339 A * | 5/1971 | Nance | ................ | B64D 1/16 169/53 |
| 3,759,330 A * | 9/1973 | Rainey | ................ | B64D 1/16 169/53 |
| 3,897,829 A * | 8/1975 | Eason | ................ | B64D 1/16 169/53 |
| 4,090,567 A * | 5/1978 | Tomlinson | ................ | B64D 1/16 169/53 |
| 4,979,571 A * | 12/1990 | MacDonald | ................ | A62C 5/02 169/44 |
| 5,069,400 A * | 12/1991 | Kovaletz | ................ | B24C 3/32 244/17.11 |
| 5,248,436 A * | 9/1993 | Kovaletz | ................ | B24C 3/06 210/924 |
| 6,003,782 A * | 12/1999 | Kim | ................ | B64D 47/08 239/428 |
| 6,644,595 B2 * | 11/2003 | Ramage | ................ | A62C 3/0228 169/53 |
| 6,889,776 B2 * | 5/2005 | Cheung | ................ | B64D 1/18 169/53 |
| 8,371,392 B2 * | 2/2013 | Ba-abbad | ................ | A62C 3/0242 239/536 |

(Continued)

*Primary Examiner* — Joseph A Greenlund
(74) *Attorney, Agent, or Firm* — SoCal IP Law Group LLP; Mark Andrew Goldstein

(57) ABSTRACT

A system for fighting fires from a helicopter. The system has a wetting agent tank to hold a wetting agent, a suppressant mix tank to hold a fire suppressant mix including water and the wetting agent, and pumps. The system has a fire hose containment system including a retractable hose to deliver the fire suppressant mix from the suppressant mix tank through a suppressant mix hose to the hose containment system and out through the retractable hose. The hose containment system has a hose drum around which the retractable hose is stored, and a motor to extend and retract the retractable hose. Coupled to the distal end of the retractable hose is a nozzle array unit configured to direct the fire suppressant mix to a fire through nozzles included in a nozzle array housing of the nozzle array unit.

20 Claims, 7 Drawing Sheets

(56) References Cited

U.S. PATENT DOCUMENTS

| | | | | |
|---|---|---|---|---|
| 9,205,291 | B2* | 12/2015 | Hawass | A62C 3/0228 |
| 9,333,379 | B2* | 5/2016 | Zimmerman | A62C 3/0242 |
| 11,717,711 | B2* | 8/2023 | Zimmerman | A62C 3/0242 |
| | | | | 169/53 |
| 12,145,793 | B2* | 11/2024 | Schellaars | B65D 88/24 |
| 2006/0175429 | A1* | 8/2006 | Lanigan, Jr. | B64D 1/16 |
| | | | | 169/53 |
| 2006/0260826 | A1* | 11/2006 | Hutter | B64D 1/16 |
| | | | | 169/53 |
| 2009/0126952 | A1* | 5/2009 | Xuan-Do | A62C 3/0242 |
| | | | | 169/53 |
| 2011/0056708 | A1* | 3/2011 | Gamble | G05B 11/06 |
| | | | | 169/14 |
| 2011/0168414 | A1* | 7/2011 | Nelson | B64D 1/16 |
| | | | | 169/53 |
| 2012/0112007 | A1* | 5/2012 | Hawass | A62C 3/0228 |
| | | | | 244/136 |
| 2013/0277074 | A1* | 10/2013 | Corujo Pardo | A62C 3/0242 |
| | | | | 169/53 |
| 2018/0043194 | A1* | 2/2018 | Zimmerman | A62C 3/0242 |
| 2020/0016442 | A1* | 1/2020 | Zimmerman | A62C 5/022 |
| 2021/0086006 | A1* | 3/2021 | Sethi | B05B 1/3402 |
| 2021/0275845 | A1* | 9/2021 | Turner | A62C 37/10 |
| 2022/0152437 | A1* | 5/2022 | Cannas | A62C 33/04 |
| 2023/0381558 | A1* | 11/2023 | Zimmerman | A62C 3/0242 |

* cited by examiner

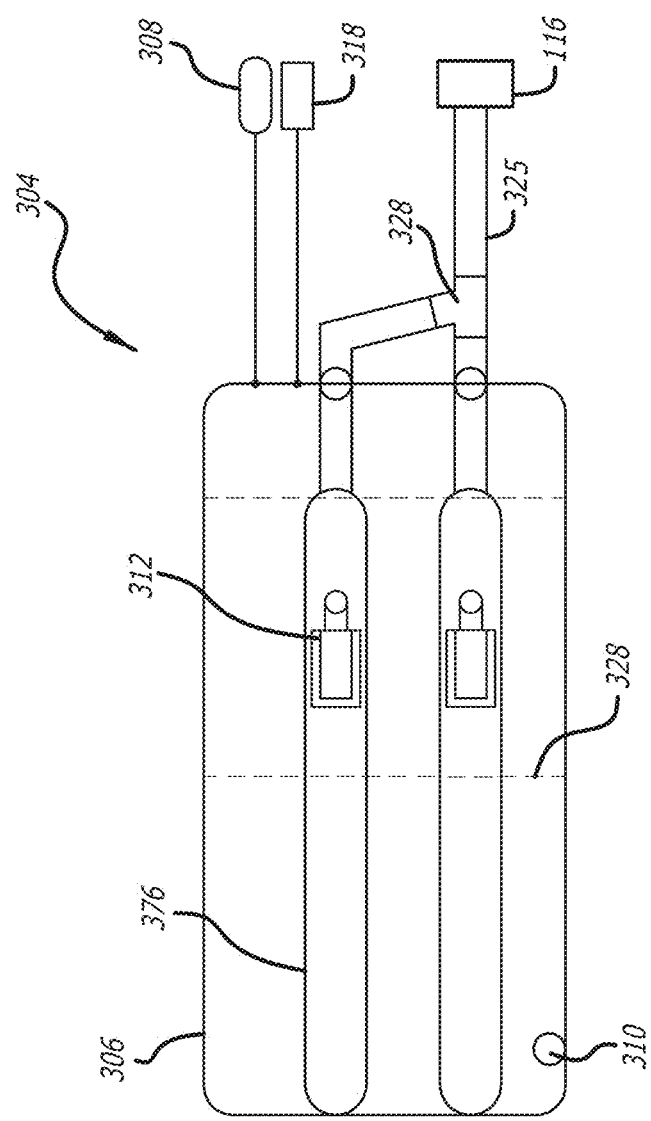

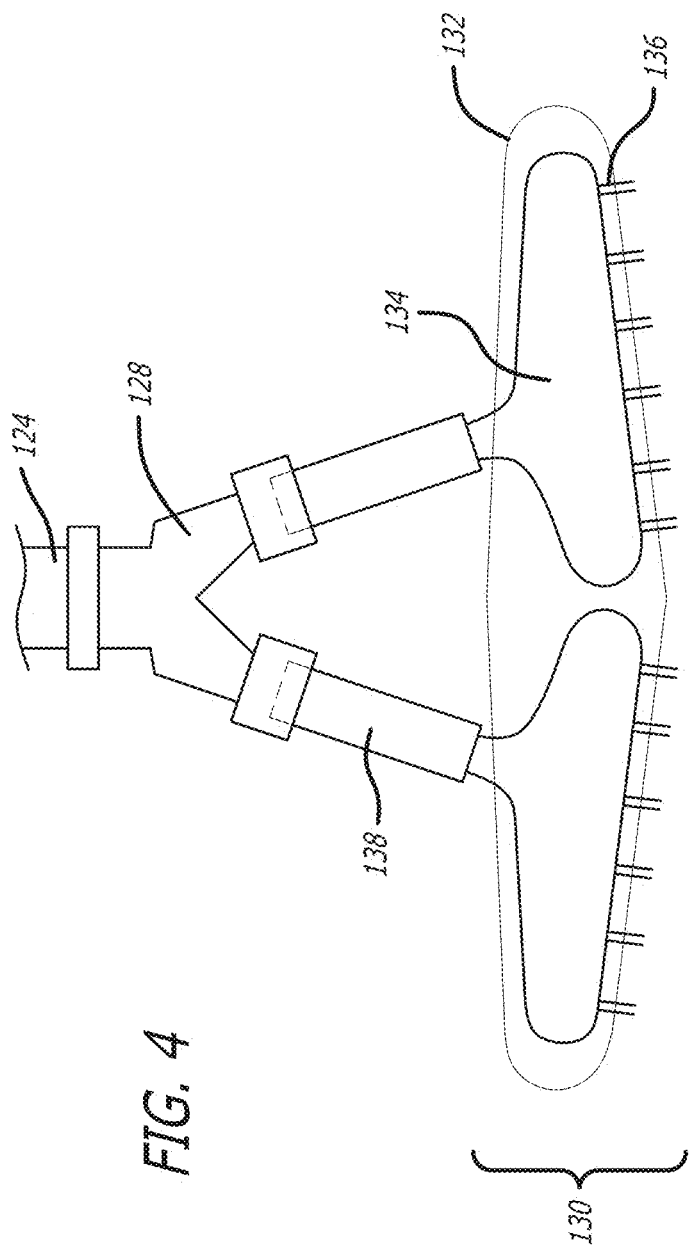

HELICOPTER AERIAL WILDFIRE SUPPRESSION SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to systems and methods for suppressing and extinguishing wildfires. Current wildfire suppression in the United States is a complex task, managed by numerous agencies. These include the U.S. Forest Service, Bureau of Land Management, U.S. Fish and Wildlife Service, National Park Service, the Bureau of Reclamation, the Army Corps of Engineers, and state departments of forestry. These groups coordinate their efforts through the National Wildfire Coordinating Group and the National Interagency Fire Center.

Despite the vast infrastructure and resources, the suppression systems currently in use, such as tankers, buckets, fire breaks, controlled burns, and fire retardants, often fall short. The challenges they face are multifaceted. For one, these suppression systems must frequently refill, reducing time spent actively combating the fire. Another issue lies in effectively and accurately dispersing suppressant to reach the fire source, which can be concealed under brush or fallen branches. Logistically, the major issue is training. Due to high speed required during suppressant discharge, training is very sensitive to helicopter type and size, bucket size, tank size, type of terrain, day/night. These factors greatly increase training costs.

Another significant performance issue of aerial wildfire suppression systems is the diminished maneuverability of helicopters. Often, helicopters must maintain high speeds to maneuver with the suppression systems, such as buckets, that only permit a one-time release of water and/or suppressant. Further, the turbulence caused by the helicopter speed and bucket (if used) results in reduced water density, resulting in greater sensitivity to wind forces and further inaccuracy of dispersed suppressant. These shortcomings leave embers burning and limit the effectiveness of suppression efforts, leading to widespread property destruction and the continued spread of wildfires.

The development of the aerial fire suppression system is based on achieving a fire source suppressant density which is constant and based on tests and simulations conducted by wildfire agencies in various countries. Further, the aerial fire suppression system must withstand natural forces such as fire winds, temperature, adapt to fuel source configurations that result in flying embers, address irregular fire fronts, and be robust enough to enable more than one helicopter at a fire source.

BRIEF DESCRIPTION OF DRAWINGS

FIG. 3 is a cross-sectional top view of a suppressant assembly of the fire suppression system.

FIG. 4 is a cross-sectional top view of a nozzle array unit coupled to a retractable hose.

DETAILED DESCRIPTION

An aerial firefighting suppression ("AFS") system 100 is described herein. In one embodiment, the AFS system includes a suppressant assembly, a retractable hose assembly and a nozzle array unit. The suppressant assembly comprises a suppressant tank, a wetting agent tank, and a control panel. Coupled to the suppressant assembly is the retractable hose assembly which includes a hose containment system, a retractable hose, and a nozzle array unit attached to the distal end of the retractable hose.

The AFS system provides for effective aerial wildfire suppression, capable of being attached to the underside of helicopters, except for the hose containment system that is mounted to either lateral side of the helicopter. Unlike common aerial fire suppressant systems, such as drop buckets that release the entirety of the fire suppressant at once, the AFS system provides for staggered release of the fire suppressant mix over a period of time and enables operators of the helicopter to control the amount of fire suppressant released. The AFS system is scalable and may be used with helicopters that range in size from small, such as, for example, BELL 202 helicopters from Bell Textron and FIREHAWK helicopters from Lockheed Martin, to large, such as CHINOOK helicopters from Boeing.

The reduced speeds and increased maneuverability permit the AFS system to be deployed on multiple helicopters on the site of a fire, especially to protect property, serving as aerial firefighters. A benefit of using a relatively smaller helicopter is quicker initial response time to fires in comparison to the response time of multi-crew helicopters. Another benefit is the protection afforded by the inclusion of the retractable hose in the AFS system to discharge suppressant regardless of the turbulence generated by helicopters, such as FIREHAWK helicopters which are used often.

Figure 1:
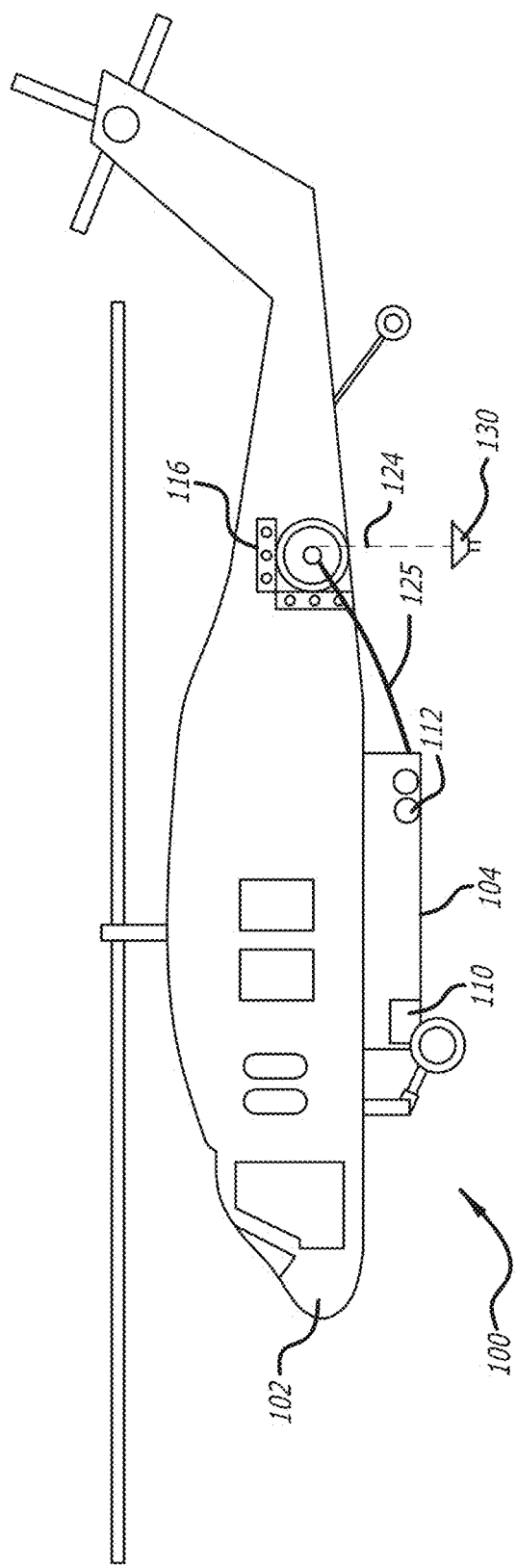
FIG. 1 is a left side view of a fire suppression system coupled to a helicopter.

Referring to FIG. 1, An AFS system 100 is configured to a helicopter 102 such that a suppressant assembly 104 is centrally located on the underside of the helicopter 102. Further, a hose containment system 116 is mounted to the exterior of the helicopter 102. The hose containment system 116 is designed to be mounted on the lateral side of the helicopter 102.

Figure 2:
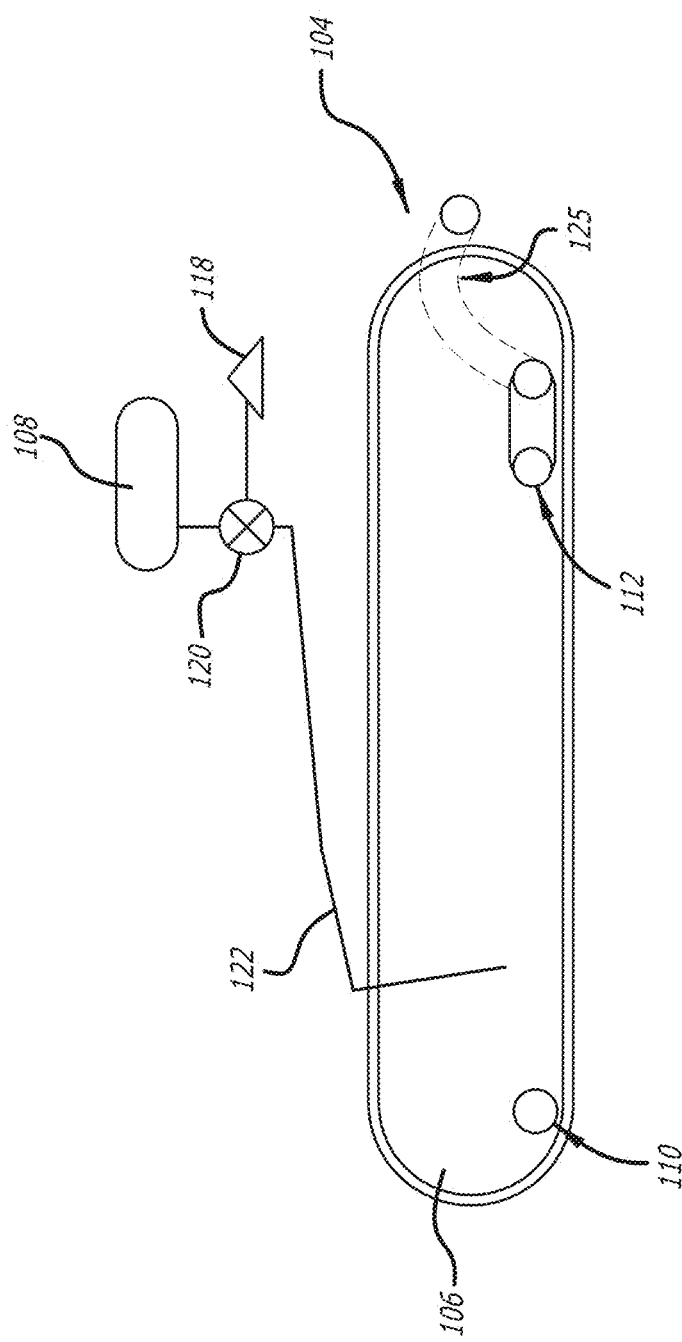
FIG. 2 is a cross-sectional left side view of a suppressant assembly of the fire suppression system.

Referring to FIG. 2, a depiction of the suppressant assembly 104 is shown. The suppressant assembly 104 includes a suppressant tank 106, a wetting agent tank 108, a refill assembly 110, at least one suppressant pump 112, and a control panel 118. The suppressant tank 106 is used to hold a fire suppressant mix, which is a combination of water and a wetting agent. For example, water stored in the suppressant tank 106 is mixed with a commercially available wetting agent such as, for example, COLD FIRE available from Firefreeze Worldwide, Inc. or DRENCH available from Denko, Inc. The suppressant tank 106 has a volumetric capacity sufficiently large to store the fire suppressant mix of, for example, 500 gallons, 750 gallons, 1,000 gallons, 1,200 gallons, 2,000 gallons, etc. depending on the helicopter's carrying capabilities. For example, FIREHAWK helicopters accommodate a 1,000 gallon tank, whereas a BELL 212 helicopter supports a 500 gallon tank. Standard tanks have dimensions of 14.5 feet in length, 6.5 feet in width, and a tapered depth having 2.5 feet at the front and 2 feet at the back. The dimensions of the suppressant tank 106 are dependent on the type of the helicopter for which the AFS system 100 is configured. The suppressant tank 106 size and configuration are also dictated by FAA regulations.

Whereas present systems have the tanks drop all, or in three segments, instead, the suppressant tank 106 contains the suppressant pump 112 to discharge a known rate of fire suppressant mix, thereby resulting in a fixed, constant drop density.

A benefit of using a wetting agent is a reduction in the amount of water needed to extinguish a fire, as the added wetting agent actively prevents reignition of a fire by reducing heat and fuel sources. The wetting agent tank 108 contains self-mixing, commercially available wetting agents such as but not limited to COLD FIRE or DRENCH, to mix with the water in the suppressant tank 106. COLD FIRE works by ceasing the chain propagation of the free radical reaction of fire. It does this by removing the heat from the fire triangle and immediately bringing the fire below its flash point. Simultaneously, COLD FIRE works to encapsulate the fuel source. When properly applied, this cooling and encapsulation process prevents the possibility of reignition. This enables suppression of flying embers. The wetting agent is fed to the suppressant tank 106 from the wetting agent tank 108, in various embodiments, by gravity feed or via a wetting agent pump 120. The amount sent is controlled by a solenoid valve controlled by the control panel 118. The wetting agent tank 108 has a capacity of 100 gallons or 200 gallons depending on the weight capacity of the helicopter for which the AFS system is configured. The wetting agent tank 108 is mounted within the fuselage of the helicopter and connected to the suppressant tank 106 through a hose 122.

For repeatable and consistent mixture ratios, sensors are included in the suppressant tank 106 to indicate the amount of wetting agent needed based on the amount of water to be added to the suppressant tank 106. The sensors may be, for example, ultrasonic, optical, magnetic, capacitive, inductive, laser-based, load cells, hydrostatic, radar, float, or any type of sensor commercially available usable to detect volumetric levels within the suppressant tank 106. The control panel 118 has a processor, memory and a storage device that can execute preprogrammed instructions. The control panel 118 takes readings from the sensors within the suppressant tank 106 to track the amount of fire suppressant mix discharged to then determine the amount of wetting agent needed to be added before refilling the suppressant tank 106. For example, to create the appropriate ratio of water to wetting agent mix before a subsequent use, if the sensors indicate to the control panel 118 that half of the fire suppressant mix has been dispersed, the control panel 118 will then engage the wetting pump 120 (or pumps) or solenoid valve to dispense half the amount of wetting agent before water is added to the suppressant tank 106. The sensors in the suppressant tank 106 are standard, commercially available sensors used to determine the remaining volume of the fire suppressant mix.

A benefit of the wetting agent being self-mixing is the elimination of the need for premixing the wetting agent with the water and the resulting elimination of a need for a mixing apparatus to combine the two. The use of the wetting agent reduces the cohesive force of water thus increasing the penetration to lower fuel, crevices, and protected under brush.

The suppressant assembly 104 includes a refill assembly 110. The refill assembly 110 is a commercially purchased system used on many helicopters and mounted in accordance with approved standards. For example, in one embodiment, the refill assembly is manufactured by Kawak Aviation Technologies, Inc. of Bend, Oregon. The refill assembly 110 includes a pump, a hose assembly, and a control panel with display. A benefit of using the AFS system is that it retrieves the hose assembly during flight, eliminating the possibility of entanglement with the AFS system's retractable hose during fire suppressant mix discharge. Further, since the active refill assembly pump is not activated at the same time as the suppressant pump, no additional electrical power is required.

Contained within the suppressant tank 106 is at least one suppressant pump 112. The suppressant pump 112 is responsible for discharging the fire suppressant mix through a suppressant tank hose 125 at a rate between 800 gallons per minute ("GPM") to 1,200 GPM. The suppressant pump 112 is the same kind as the refill assembly 110 pump, except the suppressant pump 112 does not need a debris screen as commonly found in commercially available refill assembly pumps. The suppressant pump 112 is (or suppressant pumps are) connected to the control panel 118. This allows the AFS system 100 operator to control the fire suppressant mix discharge. A benefit of the AFS system providing the capability of controlling the fire suppressant mix discharge is effective extinguishing of hot spots, unlike other fire suppressant systems that discharge all the suppressant at once. An added benefit of controlling the fire suppressant mix discharge is reduction in fire suppressant mix waste when moving between hot spots and buildings and changing to different areas of the fire front. This increases the effectiveness and efficiency of firefighting helicopters equipped with the AFS system 100.

Multiple sensors, for example level sensors, are incorporated in the suppressant tank 106 such that the control panel 118 can be configured by a user to automatically shut off the suppressant pump (or pumps) 112 when the fire suppressant mix level is below a level that prevents the suppressant pump (or pumps) 112 from self-priming. The control panel 118 monitors readings from the incorporated sensors and compares these readings with the amount of fire suppressant mix discharged to determine the amount remaining. The control panel 118 further displays the remaining level of suppressant available to the user via a display.

Referring again to FIG. 1, the suppressant pump (or pumps) 112 discharges the fire suppressant mix through the suppressant tank hose 125 to the retractable fire hose 124 in the hose containment system 116. The retractable hose 124 is a commercially available industrial Mill hose without an additional jacket. The additional jacket is not used because the maximum pressure exerted on the retractable fire hose 124 will be less than 50 pounds per square inch ("PSI"). Removing the additional jacket from the retractable hose 124 reduces the weight by one half and requires less storage room in the hose containment system 116. When in use the retractable hose 124 has a four-inch diameter, allowing the fire suppressant mix to flow through the retractable hose 124 at a rate between 800 and 1,200 GPM. For higher flow rates, the retractable hose 124 diameter can be increased to 5 inches. A benefit of using a hose over a drop bucket is that the hose protects fire suppressant mix discharge from wind and helicopter turbulence, thus reducing the loss of fire suppressant mix and increasing firefighting effectiveness. The higher the density of fire suppressant mix that can reach a fire or embers, the greater the effectiveness of the fire suppressant mix is at preventing continual burning or re-ignition of a fire.

Referring now to FIG. 3, the suppressant assembly is shown. The suppressant assembly 304 includes a suppressant tank 306, a wetting agent tank 308, a refill assembly 310, at least one suppressant pump 312, and a control panel 318. This embodiment of the suppressant assembly 304 uses two suppressant pumps 312. The suppressant tank 306 contains the two suppressant pumps 312. Each of the two suppressant pumps 312 may operate independent from one another, meaning one pump can be shut down while the other stays on. As such, the discharge of the fire suppressant mix is half the flow rate compared to two suppressant pumps 312 operating simultaneously. The suppressant pumps 312 may be commercially available pumps such as from CARRY, CP04, and HIGH VOLUME. While the suppressant pumps 312 use commercially available pumps, the conventional screens found in commercially available pumps are removed when included in the suppressant assembly 304. Removing the conventional screens surrounding the outer perimeter of the suppressant pumps 312 reduces the overall diameter of the suppressant pumps 312 from 15 inches to about 5 inches. The reduced size of the inlet permits a smaller suppressant tank 306. For example, the tanks of a FIREHAWK helicopter are 14.5×6.5×2 feet, whereas the suppressant tank 306 is sized, 12.5×6.5×1.5 feet, in one embodiment.

The suppressant pumps 312 are configured to have two four (4) inch impellers positioned to receive the fire suppressant mix in both lateral and vertical directions. The suppressant pumps 312 are submerged in the fire suppressant mix to ensure efficient operation. To ensure the level of the fire suppressant mix is sufficient for the suppressant pumps 312, at least one duct 376, or depressions, are integrated within the suppressant tank 306. The number of ducts 376 corresponds to the number of suppressant pumps 312. One embodiment uses two suppressant pumps 312 and therefore has two ducts 376. The ducts 376 are formed as part of the suppressant tank 306. The ducts 376 are situated on the bottom of the suppressant tank 306 forming a channel that extends from the front of the tank towards the rear of the suppressant tank 306. The suppressant pumps 312 are removably secured within the ducts 376 and are suspended from the bottom of the ducts 376 approximately one (1) inch from the bottom. The ducts 376 are configured to accommodate the suppressant pumps 312 such that the suppressant pumps 312 are submerged within the ducts 376. For example, the ducts 376 may be from four (4) to five (5) inches in width and can be from 5 to 7 inches in depth to accommodate full submersion of the suppressant pumps 312 in the fire suppressant mix. An added benefit of the ducts 376 is directed flow of the fire suppressant mix to the suppressant pumps 312. The ducts 376 extend from the front of the tank to about one foot after the suppressant pumps 312 outlets. From about one (1) foot after the suppressant pumps 312 outlets, the ducts 376 slope upwardly from the bottom of the suppressant tank 306. A benefit of sloping the ducts 376 upwardly from the rear of the suppressant pumps 312 is to ensure the suppressant pumps 312 remain submerged in the fire suppressant mix. At the location of the suppressant pumps 312, the ducts 376 expand laterally outward 6 inches, then extend towards the rear of the suppressant tank 306 to accommodate the suppressant pumps 312 impeller intake length, and then retract laterally inward to envelope the suppressant pumps 312. The edges of the ducts 376 are rounded to eliminate any ripple effects in the fire suppressant mix.

The suppressant tank 306 includes a set of sensors located on the interior walls of the suppressant tank 306 set at about 1 inch from the suppressant tank 306 bottom. The sensors provide readings to the control panel 318 that is connected to the suppressant pumps 312 such that when the fire suppressant mix reaches below an operative level, the control panel 318 will stop the suppressant pumps 312. The amount of fire suppressant mix remaining at pump shut off is less than 60 gallons for a 1000 gallon tank. This is insignificant relative to present tanks which discharge the entire volume in one step, or one third in three steps, resulting in decreasing density at final contents, and major ineffectiveness due to great amount not hitting the fuel source, and not fully evaporating.

The suppressant tank 306 further incorporates a set of flexible screens 378 that are fastened to the top of the suppressant tank 306 that extend downward to about 3 inches above the bottom of the suppressant tank 306. The flexible screens 378 are located at a predetermined point in front of and behind the suppressant pumps 312. The suppressant pumps 312 discharge the fire suppressant mix through a suppressant tank hose 325 via a WYE junction 328 to the hose containment system 116.

Figure 5A:
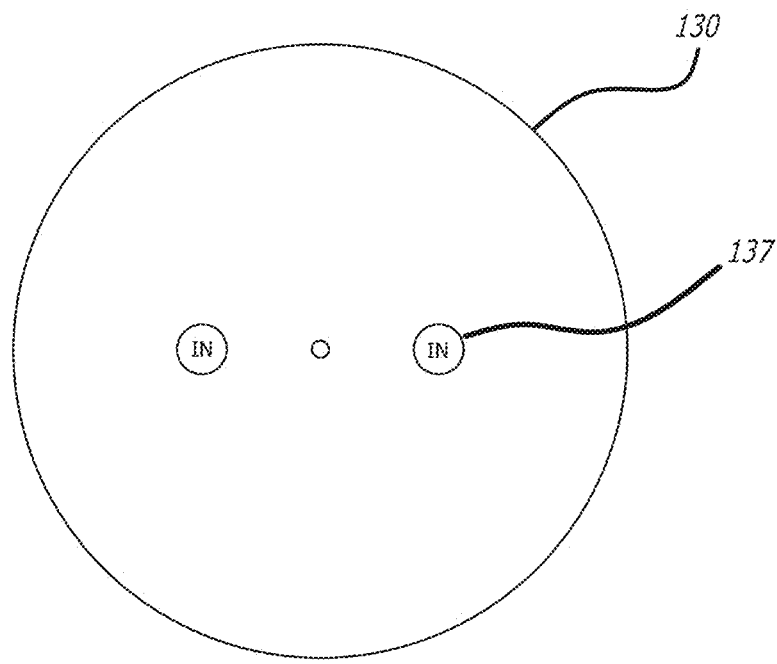
FIG. 5A is a top view of the nozzle array unit.

Referring now to FIG. 4, the nozzle array unit 130 is attached to the distal end of the retractable hose 124. The nozzle array housing 132 of nozzle array unit 130 is coupled to the retractable hose 124 through a WYE junction 128 via two flat hoses 138. Each end of the WYE junction 128 is coupled to two turbulence filter chambers 134 housed within the nozzle array housing 132 via at least one inlet 137 (as shown in FIG. 5A). Each turbulence filter chamber 134 extends to six smooth bore nozzles 136. The smooth bore nozzles 136 protrude outwardly from the nozzle array housing 132 toward the fire.

The nozzle array unit 130 includes nozzle array housing 132 made from a high temperature tolerant material. In one embodiment, the nozzle array housing 132 is fourteen inches to sixteen inches in diameter. In other embodiments, the nozzle array housing 132 may be larger or smaller to accommodate more and fewer nozzles.

The nozzle array housing 132 is in the shape of an airfoil. A benefit of an airfoil shape is to lower the low drag coefficient, thereby greatly reducing the swinging of the retractable hose 124. The airfoil configuration results in better response by the nozzle array unit 130 to changes in helicopter directions, thereby resulting in accurate drops for irregular fire fronts. In addition, the reduced drag coefficient further reduces the retractable hose 124 sway, thus permitting the AFS system enabled helicopter to follow fire edges more closely during discharge of the fire suppressant mix.

A benefit of the turbulence filter chambers is the generation of an even PSI force to each of a plurality of smooth bore nozzles 136 at the distal end of the nozzle array housing 132. The turbulence filter chambers act to reduce any large ripples from the input fire suppressant mix flow. The nozzle array housing 132 nozzle array unit 130 is coupled to the WYE junction 128 through two flat hoses 138. The flat hoses 138 are smaller in diameter than the retractable hose 124. In one embodiment, the flat hoses 138 have a diameter of two (2.0") to two and one half inches (2.5"), inclusive, or other size sufficient to support at least 800 GPM of suppressant. The flat hoses 138 extend from the WYE junction 128 a length of six inches, so that it can be stored during hose retraction with sufficient ground clearance. As shown in FIG. 5A, the flat hoses 138 connect to at least one inlet 137 located on the top end of the nozzle array unit 130. Shorter extension hoses make it easier to store the retractable hose 124. In one embodiment, the nozzle array unit 130 includes a total of twelve smooth bore nozzles. In other embodiments, more and fewer nozzles may be included in the nozzle array unit.

Figure 5B:
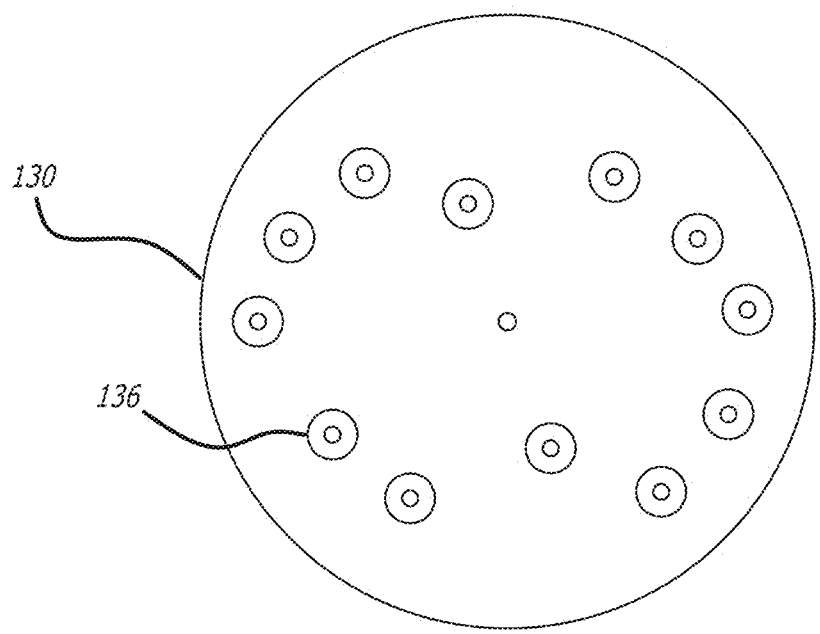
FIG. 5B is a bottom view of the nozzle array unit.

Referring to FIG. 5B, each of the smooth bore nozzles 136 are arranged, in one embodiment, four inches apart to generate powered, individual, jet streams to the fire source. The smooth bore nozzles 136 may have smaller or greater separation. The smooth bore nozzles 136 at the rim of (also referred to at the outer area of) the nozzle array unit 130 are angled twenty (20) to thirty (30) degrees from vertical. In other embodiments, other angles can be used, such as five and ten degrees, for example, depending on the fuel sources, such as grass, trees, etc. In the nozzle array unit 130, the inner smooth bore nozzles 136 generally centrally located in the nozzle array housing are directly vertical (zero degree from vertical), or perpendicular to the nozzle array housing 132. The configuration of angled smooth bore nozzles 136 in the outer area causes the jet streams of the fire suppressant mix cover a greater target area with an even fire suppressant mix density at the fire source. A benefit of having the smooth bore nozzles 136 in this configuration is an increased surface area of the fire suppressant mix caused by generating multiple smooth jet streams that result in an increase of the velocity of the fire suppressant mix at the fire source which increases the amount of penetration of the suppressant mix with COLD FIRE resulting in improved ability to extinguish the fire. The configuration of the nozzles in the nozzle array unit reduces the sensitivity of the jet streams to the environment, in particular, wind, and provides for uniform density leaving no gaps, which reduces absorption entrainment of air/oxygen in the jet stream.

Each of the smooth bore nozzles 136 are commercially available, for example, from ELKHART or AKRON. The benefit of using a smooth bore is increased pressure resulting in a more solid jet stream. Further, the smooth bore shape reduces any ripple, thereby creating a tighter jet stream. The smooth bore nozzles 136 are connected via standard adapters, enabling easy change of the nozzles 136 to change the resulting type of jet stream. The smooth bore nozzles 136 are, in one embodiment, seven-eighths of an inch in diameter. In other embodiments, the smooth bore nozzles 136 have other sizes.

Specific fire suppressant mix discharge patterns are generated by removing and/or plugging one or more of the smooth bore nozzles 136. The smooth bore nozzles 136 may be adjusted and configured to be most effective against the type of fuel and the environmental conditions. For example, a chemical fire may require a different nozzle configuration than a brush fire. The configuration of the smooth bore nozzles 136 and each nozzle bore size may be substituted or changed out to access different smooth bore sized standard nozzles, or a combination of spray bore nozzles as commercially manufactured. The smooth bore nozzles 136 are arranged in locations such that the fire suppressant discharge patterns are mostly insensitive to moderate rotational changes relative to flight path. The flow rate of the fire suppressant discharged from the smooth bore nozzles 136 is configured to cause an even density of the fire suppressant mix to reach the fire source without any gaps. In this way, the integrity of the individual jets is maintained, resulting in minimum loss of fire suppressant due to winds while achieving maximum penetration to the fuel sources.

Figure 6:
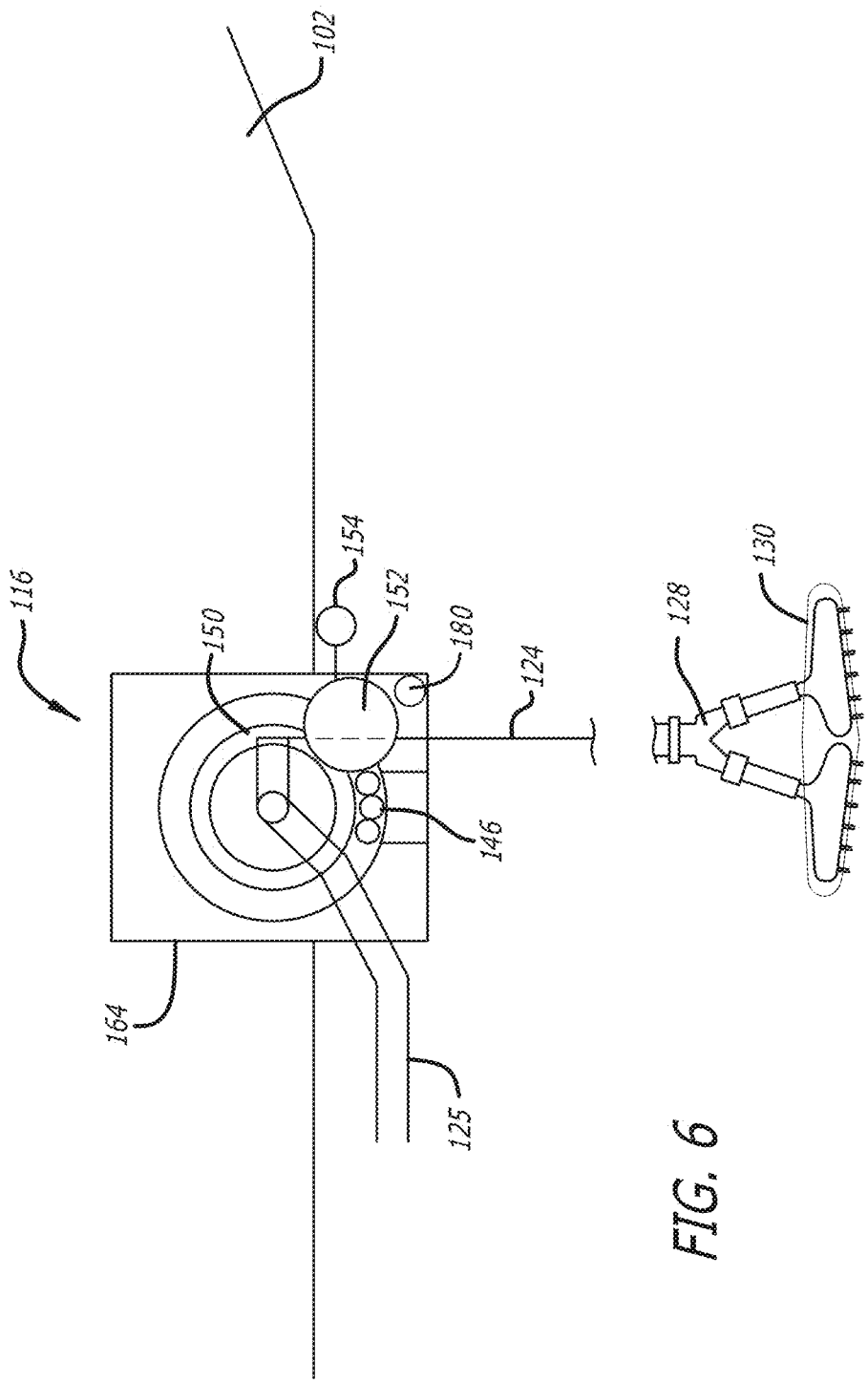
FIG. 6 is a cross-sectional left side view of a hose containment system.

Referring to FIG. 6, the AFS system utilizes the hose containment system 116 to extract/release the retractable hose 124. The hose containment system 116 can extract/release the retractable fire hose 124 while remaining connected to the suppressant tank 106 through the suppressant tank hose 125. In this way, the retractable fire hose 124 is contained, allowing the helicopter full maneuverability. The extraction and retraction of the retractable fire hose 124 is performed when there is no fire suppressant mix flowing through the retractable fire hose 124. The hose containment system 116 is sized to support hose lengths from 25 feet to 75 feet. The hose containment system 116 is vertically positioned near the rear of the helicopter and behind the suppressant assembly (not shown, see FIG. 1).

The hose containment system has an output detector 180. The output detector 180 indicates when the WYE junction 128 is positioned directly vertical in hose containment system 116. The output detector 180 may be, for example, ultrasonic, optical, magnetic, capacitive, inductive, laser-based, proximity, resolver, potentiometer or any type of position based sensor/detector commercially available to detect when the WYE junction 128 is positioned vertically in the hose containment system 116. The time to stop is accounted for by the location where the output detector is mounted. The output detector 180 will automatically notify the operator when the retractable hose 124 is near the end of the extension/retraction and automatically stop the motor 154 at full extension/retraction. The output detector 180 provides the control panel the numerical length of the extended portion of the retractable hose in a display included in the controller to allow the operator to view the amount of hose extended/retracted and monitor the operation of the retractable hose 124.

Figure 8:
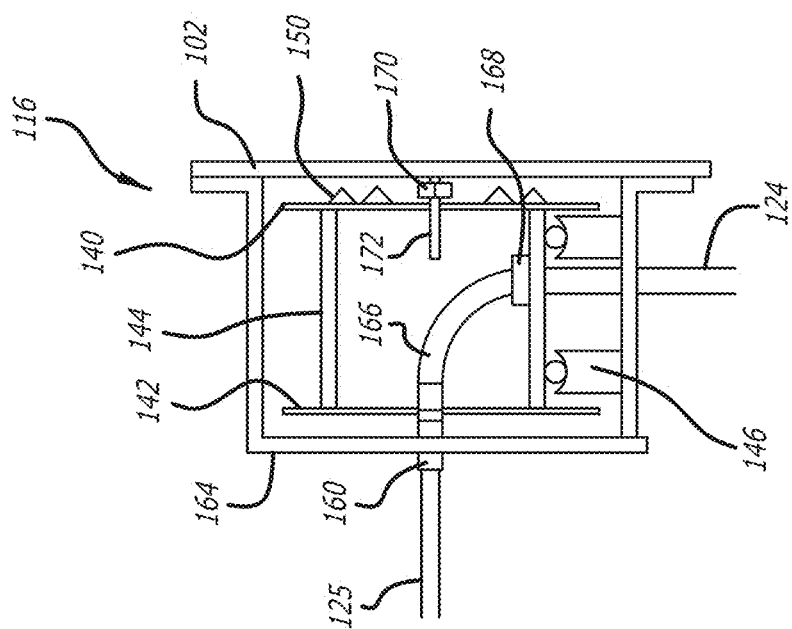
FIG. 8 is a cross-sectional left side view of the hose containment system.
Figure 7:
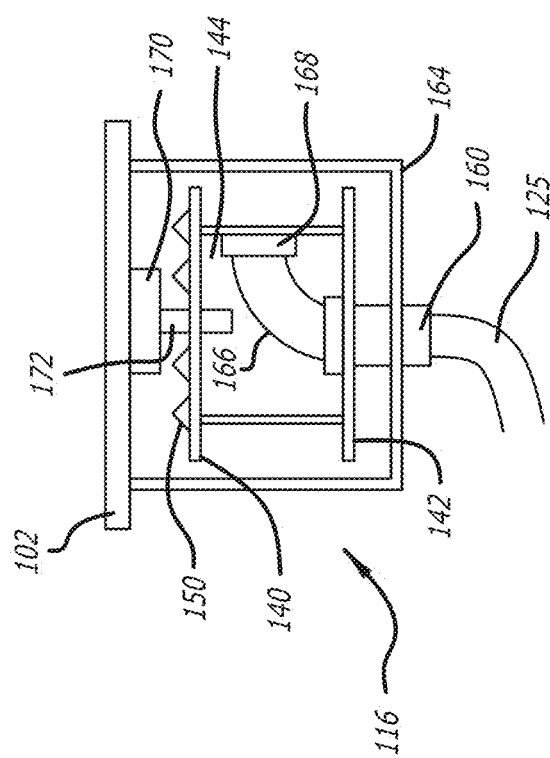
FIG. 7 is a cross-sectional top view of the hose containment system.

Referring to FIGS. 7 and 8, the hose containment system 116 having a circular drum configuration is shown. The hose containment system 116 in a circular drum configuration has a top plate 140 and a bottom plate 142 coupled encompassed by a drum 144, all enveloped by a drum frame 164 attached to the frame of the helicopter 102. The top plate 140, the bottom plate 142 and drum 144 are configured to adapt to the retractable hose 124 when in a rolled-up position. The suppression tank hose 125 is connected to the fixed end of a Storz rotating coupler 160. The fixed end is mounted to the drum frame 164. The rotating section of the Storz rotating coupler 160 is attached to the drum 144. A flexible angled hose 166 is connected to one end to the Storz rotating coupler 160 and the other end to the drum 144 by a standard firehose connector 168. The retractable hose 124 is connected to the standard firehose connector 168.

The top plate 140 is coupled to a spur gear 150 that is configured to engage with a second spur gear 152 fixed to a motor 154. The motor 154 (see FIG. 6) is connected to the control panel which provides the operator the ability to engage and disengage the motor 154, or to place the motor in automatic mode. When the motor 154 is activated, it provides a rotational force to the second spur gear 152. As the spur gears engage, the drum 144 rotates in a clockwise/counterclockwise direction. The drum 144 is mounted to the helicopter 102 frame by a bearing HUB 170 at the helicopter 102 side, and to the fixed side of the Storz rotating coupler 160 to the drum 144. The bearing rollers 146 are mounted on the bottom of the drum 144 and are positioned near both the top plate 140 and the bottom plate 142. This configuration supports the drum 144 during extraction, retraction and discharging of the retractable hose 124. The features of the drum 144, the spur gear 150, along with the motor 154 gearhead, may be adjusted to optimize the retraction force capacity to rate of the retractable hose 124 retraction.

The AFS system permits the use of non-heavy-duty standard industrial, mill retractable hoses 124 as the pressure supporting the flow of the fire suppressant mix to be under 50 PSI. In this way, the retractable hose in alternate embodiments is used without a rubber jacket, which requires less power from the motor 154 and can therefore retract the retractable hose 124 readily and quickly. The benefit of this configuration is faster response times to extinguish hot spots and close support of buildings.

It is claimed:

1. A system for fighting fires from a helicopter, the system comprising:
   a wetting agent tank to hold a wetting agent;
   a suppressant mix tank to hold a fire suppressant mix including water and the wetting agent;
   a refill assembly to pump the water into the suppressant mix tank;
   a solenoid valve to move the wetting agent from the wetting agent tank to the suppressant tank through a connecting hose connecting the wetting agent tank to the suppressant mix tank;
   a fire hose containment system including a suppressant tank hose to deliver the fire suppressant mix from the suppressant mix tank to the hose containment system, a hose drum around which a retractable hose is to be stored, and a motor to extend and retract the retractable hose;
   a nozzle array unit coupled to the retractable hose, the nozzle array unit having at least twelve nozzles in a nozzle array housing, wherein the nozzle array unit is configured to direct the fire suppressant mix to a fire through the at least twelve nozzles;
   at least one suppressant mix pump for expelling the fire suppressant mix from the suppressant mix tank through a suppressant mix tank hose, to the house containment system, through the retractable hose and out through the at least twelve nozzles.

2. The system of claim 1, wherein the at least twelve nozzles are smooth bore nozzles.

3. The system of claim 1, wherein each nozzle adjacent to an edge of the nozzle array unit is angled outward from the nozzle array unit.

4. The system of claim 1, wherein some of the at least twelve nozzles are angled perpendicular to the nozzle array unit.

5. The system of claim 1, wherein the nozzle array unit includes two turbulence filter chambers to create an even pressure of flow of the combination of the water and the wetting agent.

6. The system of claim 1, wherein a capacity of the suppressant mix tank is from 300 gallons to 1,000 gallons.

7. The system of claim 1, wherein the suppressant mix pump discharges the fire suppressant mix at a rate from and including 800 gpm to 1,200 gpm.

8. The system of claim 1, wherein the retractable hose is from 25 feet to 75 feet in length.

9. The system of claim 1, wherein the suppressant mix tank is formed by at least one duct extending the length of the suppressant mix tank, the at least one duct is configured to receive the at least one suppressant mix pump.

10. The system of claim 1, wherein the system further includes a control panel with a display configured to enable both manual and automatic engagement of the suppressant mix pump, the refill assembly, and the solenoid valve.

11. The system of claim 1, wherein the wetting agent tank is mounted to a fuselage of the helicopter.

12. The system of claim 1, wherein the suppressant mix tank is attached to a bottom of the helicopter.

13. The system of claim 1, wherein the helicopter is one selected from the group including BELL, FIREHAWK and CHINOOK helicopters.

14. The system of claim 1, further comprising a plurality of level sensors in the suppressant mix tank to sense a measured level of the suppressant in the suppressant mix tank.

15. The system of claim 14, wherein data from the level sensors enable calculating an average amount remaining of the fire suppressant mix in the suppressant mix tank.

16. The system of claim 15, wherein the calculating is based on the measured level obtained from the level sensors and a measured discharge amount.

17. The system of claim 14, wherein the system further includes a control panel with a display which shows the measured level of the suppressant mix in the suppressant mix tank obtained from the level sensor.

18. The system of claim 1, further comprising a detector in the fire hose containment system to indicate that the retractable hose that has been extracted and properly vertically positioned to stop the extraction action.

19. The system of claim 1, wherein the retractable hose is a flat mill MD industrial hose without a high pressure jacket layer.

20. The system of claim 1, wherein the suppressant mix tank has a set of screens secured to the interior top end of the suppressant mix tank.

* * * * *